United States Patent [19]

Kaes

[11] 3,947,282

[45] Mar. 30, 1976

[54] INORGANIC VITREOUS DETECTOR MATERIAL

[75] Inventor: Hans-Herbert Kaes, Wetzlar-Dorlar, Germany

[73] Assignee: Ernst Leitz GmbH, Wetzlar, Germany

[22] Filed: Dec. 13, 1973

[21] Appl. No.: 424,618

[52] U.S. Cl. ............... 106/54; 106/47 R; 250/273
[51] Int. Cl.² ........................................... C03C 3/16
[58] Field of Search ......................... 106/47 R, 54

[56] References Cited
UNITED STATES PATENTS

| | | | |
|---|---|---|---|
| 2,077,481 | 4/1937 | Huppert et al. | 106/54 X |
| 2,100,391 | 11/1937 | Grimm et al. | 106/47 R X |
| 2,194,784 | 3/1940 | Berger | 106/54 X |
| 2,226,418 | 12/1940 | Tillyer et al. | 106/47 R |
| 2,227,082 | 12/1940 | Grimm et al. | 106/47 R |
| 2,381,925 | 8/1945 | Pincus | 106/47 R |
| 2,477,649 | 8/1949 | Pincus | 106/47 R |
| 2,486,811 | 11/1949 | Weyl | 106/47 R X |
| 2,577,627 | 12/1951 | Pincus | 106/47 R |
| 3,516,939 | 6/1970 | Yokota et al. | 106/47 R X |

*Primary Examiner*—Allen B. Curtis
*Assistant Examiner*—Thomas A. Waltz
*Attorney, Agent, or Firm*—Erich M. H. Radde

[57] ABSTRACT

An inorganic vitreous detector material which in principle is composed of the three-component system consisting of metaphosphoric acid, aluminum metaphosphate, and zinc oxide, is used for the determination of the energy of particles of high energy. Such a material may additionally contain silicon dioxide and boron trioxide.

4 Claims, 5 Drawing Figures

INORGANIC VITREOUS DETECTOR MATERIAL

BACKGROUND OF THE INVENTION

1. FIELD OF THE INVENTION

The present invention relates to vitreous detector material and more particularly to inorganic vitreous detector material of high energy resolution, to a process of making such detector material, and to its use especially for determining the energy of particles of high energy.

2. DESCRIPTION OF THE PRIOR ART

Energy-rich particles and more particularly heavy ions and fission products, when impinging upon or penetrating into insulator materials, produce tracks or marks which can be made visible under a microscope, for instance after treatment with suitable solvents or etching means. In addition to the number of impinging particles, the energy of the particles recorded is of particular importance.

Thus it is known, for instance, that the track characteristics in solids permit to draw conclusions as to the energy of vertically impinging particles. See, for instance H. Ait-Salem et al. in "Nuclear Instruments and Methods" vol. 60 (1968), page 45; E. V. Benton et al. in "Nuclear Instruments and Methods" vol. 67 (1969), page 87; and G. Somogyi et al. in "Nuclear Instruments and Methods" vol. 63 (1968), page 189. In this connection the diameter of the etched hole proves a suitable value for the measurement. While with short etching times only a slight change of the diameter as a function of the energy of the fission products is obtained, a definite increase in the diameter of the etched hole in relation to the energy is observed on prolonged etching. For such a use, glasses have proved to be superior to plastics which show too slight a dependence on energy, or to crystals which, due to their properties of anisotropy, yield asymmetrical holes (see in this respect U. Hoppner et al. in "Nuclear Instruments and Methods" vol. 74 (1969), page 285.

In general, the etching times of glass materials bombarded with particles are, however, somewhat restricted. This is due, on the one hand, to the fact that by the "fringing out" of the holes, i.e. to the fact that the initially etched points of impact become irregular, an exact determination of the diameter of the hole is no longer possible and, on the other hand, to the fact that they can no longer be measured unequivocally due to too low a contrast in the microscope or even no contrast at all.

SUMMARY OF THE INVENTION

It is one object of the present invention to provide a vitreous detector material which assures a high energy resolution by causing the particles to impinge upon said material, to produce places of damage in the glass structure which differ distinctly from the impinged vicinity. Furthermore, the etching procedure should proceed in such a manner that more deeply penetrating particles, i.e. particles which are richer in energy, will produce wider holes and, in addition thereto, the places of damage should have approximately circular shapes at the surface even after prolonged etching.

Another object of the present invention is to provide a simple and effective process of producing such a vitreous detector material.

A further object of the present invention is to use such a vitreous detector material for determining the energy of particles of high energy, such as heavy ions, fission products, and others.

Other objects of the present invention and advantageous features thereof will become apparent as the description proceeds.

These objects are achieved in accordance with the present invention by providing a detector material which is basically composed of a three-component system consisting of metaphosphoric acid, aluminum metaphosphate, and zinc oxide in the following limits of concentration in weight percent:

20 to 60% of metaphosphoric acid $HPO_3$,
30 to 80% of aluminum metaphosphate $Al(PO_3)_3$, and
2 to 30% of zinc oxide $ZnO$.

In accordance with a particular embodiment of the present invention, such a vitreous material may also contain in addition up to 10%, by weight, of silicon dioxide $SiO_2$ and/or boron trioxide $B_2O_3$.

According to another embodiment of the present invention, it is also possible for reasons of glass technology to admix up to 5%, by weight, of conventional glass components, for instance, oxides and/or metaphosphates, to the three-component basic system.

It has been found that the tracks or marks of the impinging particles, after initial etching with different etching agents such as acids or bases, leave only nonusable traces not only in fluorine-containing glasses and in glasses of high silicate content, but also in glasses of a high lanthanum content, On the other hand, clearer and better visible tracks or marks could be obtained when using certain suitable etching agents in borate glasses. The best results, however, were obtained by the materials based on phosphoric acid according to the present invention. Such materials showed by far the greatest dependency on energy.

The glasses according to the present invention are produced, for instance, in an electric furnace by melting in a platinum crucible a homogeneous starting batch at 1200°C. to 1400°C. within 30 minutes to 60 minutes, whereafter the melt is poured onto a metal plate preheated to about 200°C. The resulting glass is then tempered so as to be free of stresses.

BRIEF DESCRIPTION OF THE DRAWINGS

The attached drawings further illustrate the present invention. In said drawings

DESCRIPTION OF THE PREFERRED EMBODIMENTS

The following example serves to demonstrate the detector properties of a glass which is composed of the three-component basic system as well as of two additional components.

|  | Weight-% | Mol % |
| --- | --- | --- |
| ZnO | 9.0 | 13.6 |
| Al(PO$_3$)$_3$ | 34.2 | 32.9 |
| HPO$_3$ | 51.3 | 44.5 |
| B$_2$O$_3$ | 4.5 | 7.9 |
| SiO$_2$ | 1.0 | 2.1 |

When considering merely the three basic components which constitute 91.0 mol% in the above example and calculating them to make up 100mol%, the following values are obtained:

| Mol-% | | Mol-% | | Weight-% |
| --- | --- | --- | --- | --- |
| 13.6 ZnO | $\triangleq$ | 14.9 ZnO | $\rightarrow$ | 6.8 ZnO |
| 32.9 Al(PO$_3$)$_3$ | | 36.1 Al(PO$_3$)$_3$ | | 53.9 Al(PO$_3$)$_3$ |
| 44.5 HPO$_3$ | | 49.0 HPO$_3$ | | 39.3 HPO$_3$ |
| ($\Sigma = 91\%$) | | ($\Sigma = 100\%$) | | ($\Sigma = 100\%$) |

Figure 1:
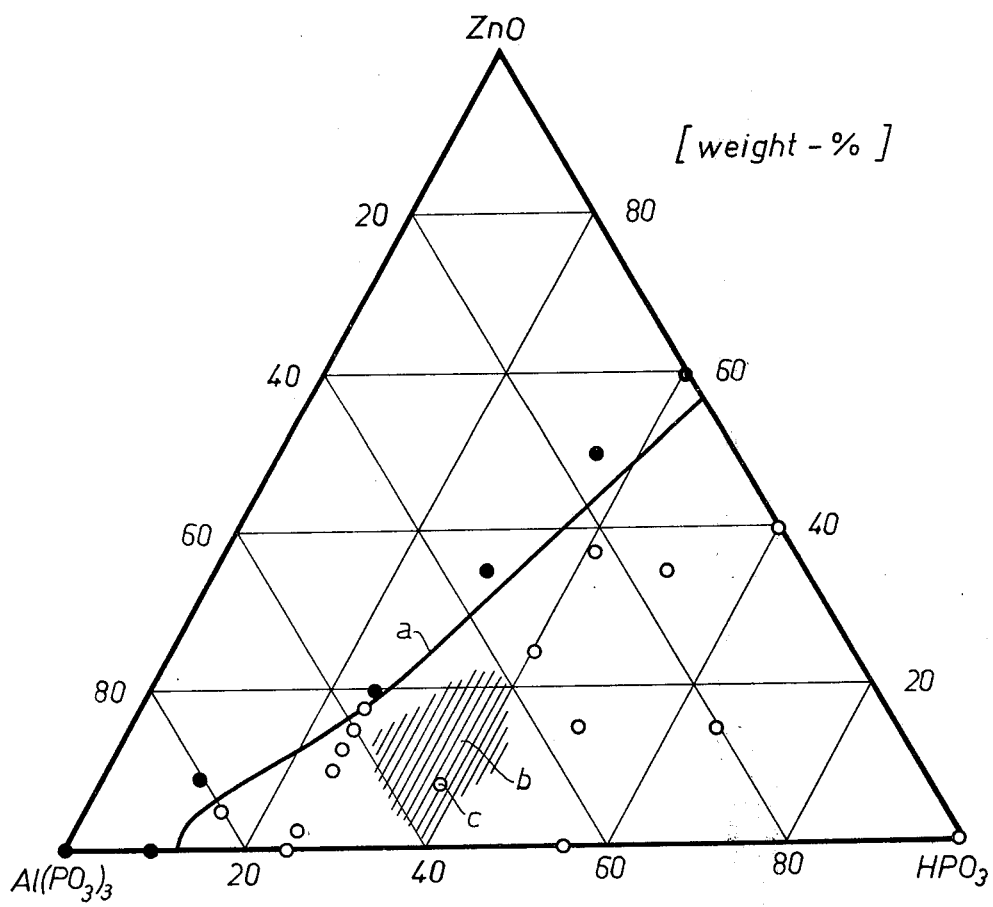
FIG. 1 is a diagrammatic view of the three-component basic system $ZnO$ - $Al(PO_3)_3$ - $HPO_3$ with the vitreous range indicated.

In FIG. 1 the three-component basic system ZnO — Al(PO$_3$)$_3$ — HPO$_3$ is shown in the form of a ternary diagram.

The solid line a represents the boundary of the vitreous range of a 20 g. melt. The solid dots indicate glasses which lie outside said vitreous range and which, therefore, have more or less pronounced tendencies to crystallize, while the empty dots indicate glasses which do not show any tendency to crystallize.

In the hatched region there are located the optimum glasses which thus are particularly well suited for use as detector material. Point c within the region b indicates the above-mentioned specific example which was entered in this graph after the three main components had been calculated and made up to yield 100%. As seen from FIG. 1, the hatched region encompasses compositions wherein the Al(PO$_3$)$_3$ content ranges from about 40 to 60% by weight, HPO$_3$ content ranges from about 30 to 45% by weight and the ZnO content ranges from about 2 to 22% by weight.

This glass was irradiated with fission products of exactly known mass and definite energy and was then etched with a 10 N sodium hydroxide solution at a temperature of 55°C. for 5000 minutes. At lower temperatures the etching time had to be increased very considerably while at higher temperatures the holes were no longer circular.

The accuracy with which differences in diameter of the holes can still be resolved by means of photomicroscopic methods is dependent essentially on the parameters specific to the microscope employed and is about ± 0.6 $\mu$m. In order to determine the average diameter of the holes for a given particle energy, up to 100 holes were measured in each case.

Figure 2:
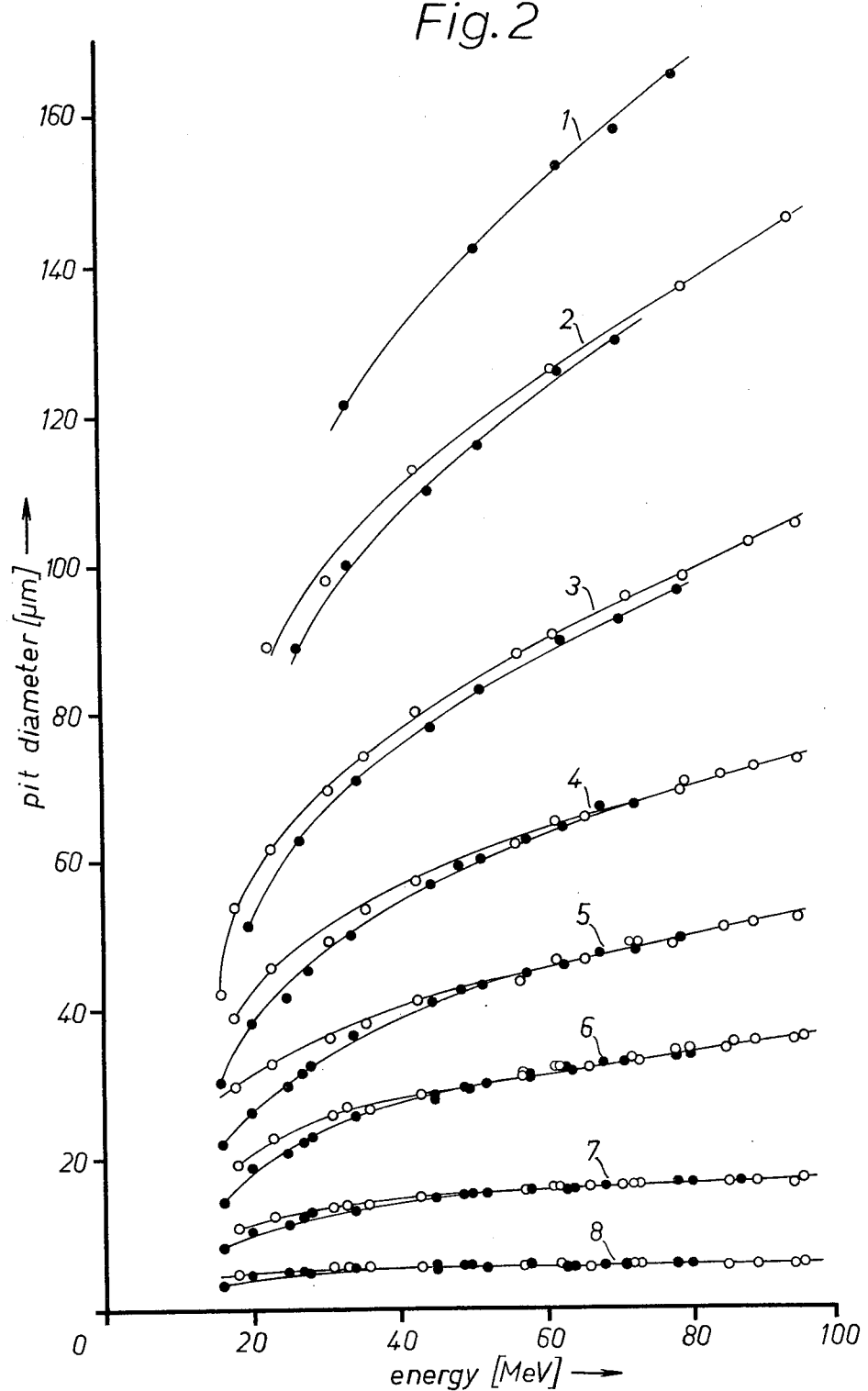
FIG. 2 shows the diameters of the holes after different etching times as a function of the energy.

In FIG. 2 there are set forth the results obtained for heavy fission products of the mass of 135 GMU - GMU standing for "General Mass Unit" and indicating the mass of the protons - and for lighter fission products of the masses of 96 GMU and 102 GMU. The diameter of the hole is indicated after different etching times as a function of the energy. The solid circles represent the fission products of heavy mass (135 GMU); the hollow circles represent fission products with the lighter masses (96 GMU and 102 GMU). The corresponding etching times (by means of 10 N sodium hydroxide solution at 55°C.) increase from Example 8 to Example 1 according to the following table:

| Example | Etching time in minutes |
| --- | --- |
| 8 | 20 |
| 7 | 60 |
| 6 | 150 |
| 5 | 270 |
| 4 | 510 |
| 3 | 1020 |
| 2 | 2500 |
| 1 | 5000 |

It is evident that hole diameters of up to 150 $\mu$m. can still be evaluated without difficulty, while when using the heretofore known detector materials, the maximum limit was at about 50 $\mu$m.

A very good energy resolution from 1.5 to 2 MeV could be obtained. Such a resolution corresponds to that of solid barrier-layer counters for fission products. Furthermore, it can be noted from FIG. 2 that lighter masses give somewhat larger diameters at the same etching time. This undesired mass "effect" is, however, very small as compared with that encountered in the case of known detector materials.

Figure 3:
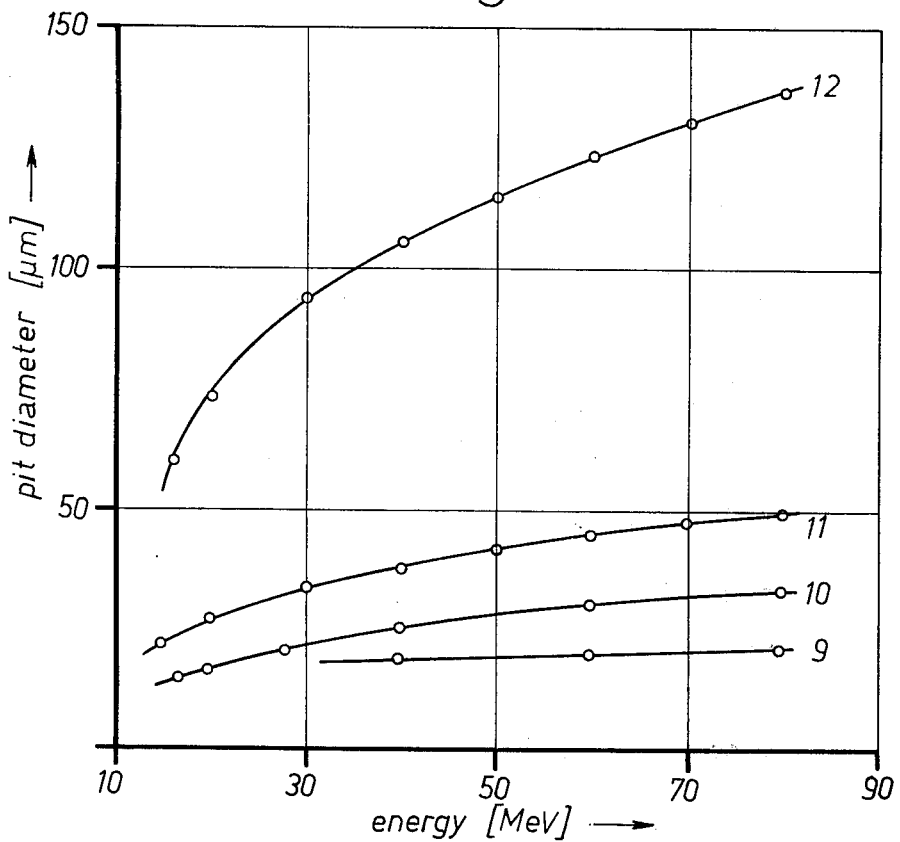
FIG. 3 shows the diameters of the holes as a function of the energy for different materials.

FIG. 3 clearly shows the superiority of the energy resolution of a glass according to the present invention as compared with that of known materials. The following Table sets forth the individual materials as well as the corresponding etching conditions:

| Reference No. | Material | | Etching conditions | |
| --- | --- | --- | --- | --- |
| 9 | Collodion | 50°C. | 30 min. | 6 N NaOH |
| 10 | Slide glass | 22°C. | 100 min. | 48% HF |
| 11 | Optical glass "PSK 53" | 20°C. | 70 min. | 1/10 N HNO$_3$ |
| 12 | Glass according to the present invention | 55°C. | 2100 min. | 10 N NaOH |

It is evident that the size of the hole diameter in the case of the known detector materials collodion, slide glass, and optical glass "PSK 53" increases only insignificantly, if at all, when the energy varies within a range of 10 MeV to 90 MeV.

In contrast thereto, the detector material of the present invention shows a clearly steeper curve and thus a far greater dependence of the specific hole diameter on the particle energy.

Surprisingly it was found that the detector material according to the present invention is particularly superior to other known detector materials — such as, for instance, the known solid-state barrier-layer counters — when, in addition to heavy ions, there is also present an additional high background, for instance, of electrons or $\gamma$-quanta, provided that the heavy ions are substantially insensitive to the electrons or $\gamma$-rays. This property found in the material of the present invention renders particularly advantageous its use as an energy resolving detector for particles of high energy. Thus the new material was placed at a distance of about 3 cm.

away in the near range of an electron beam of an intensity of 1 μA and an energy of 10 MeV for about 20 hours. While other types of glass were completely destroyed after etching under this long-time exposure, the glass according to the invention showed merely a slight pink coloration. Traces of fission products could still be measured in a satisfactory manner after such an irradiation.

Figure 5:
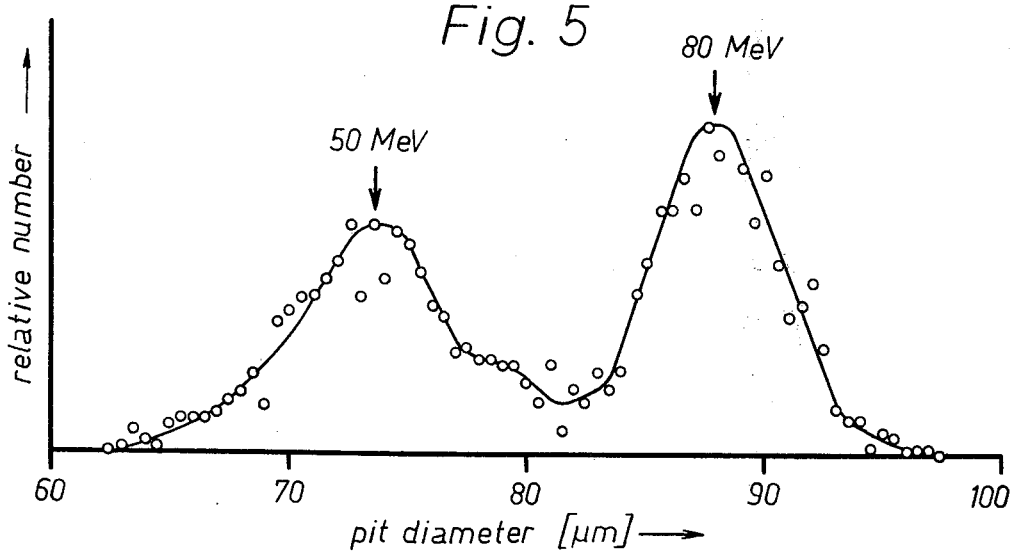
FIG. 5 shows the energy distribution curve of fission fragments for the electron-induced nuclear fission of $^{232}Th$ after etching.
Figure 4:
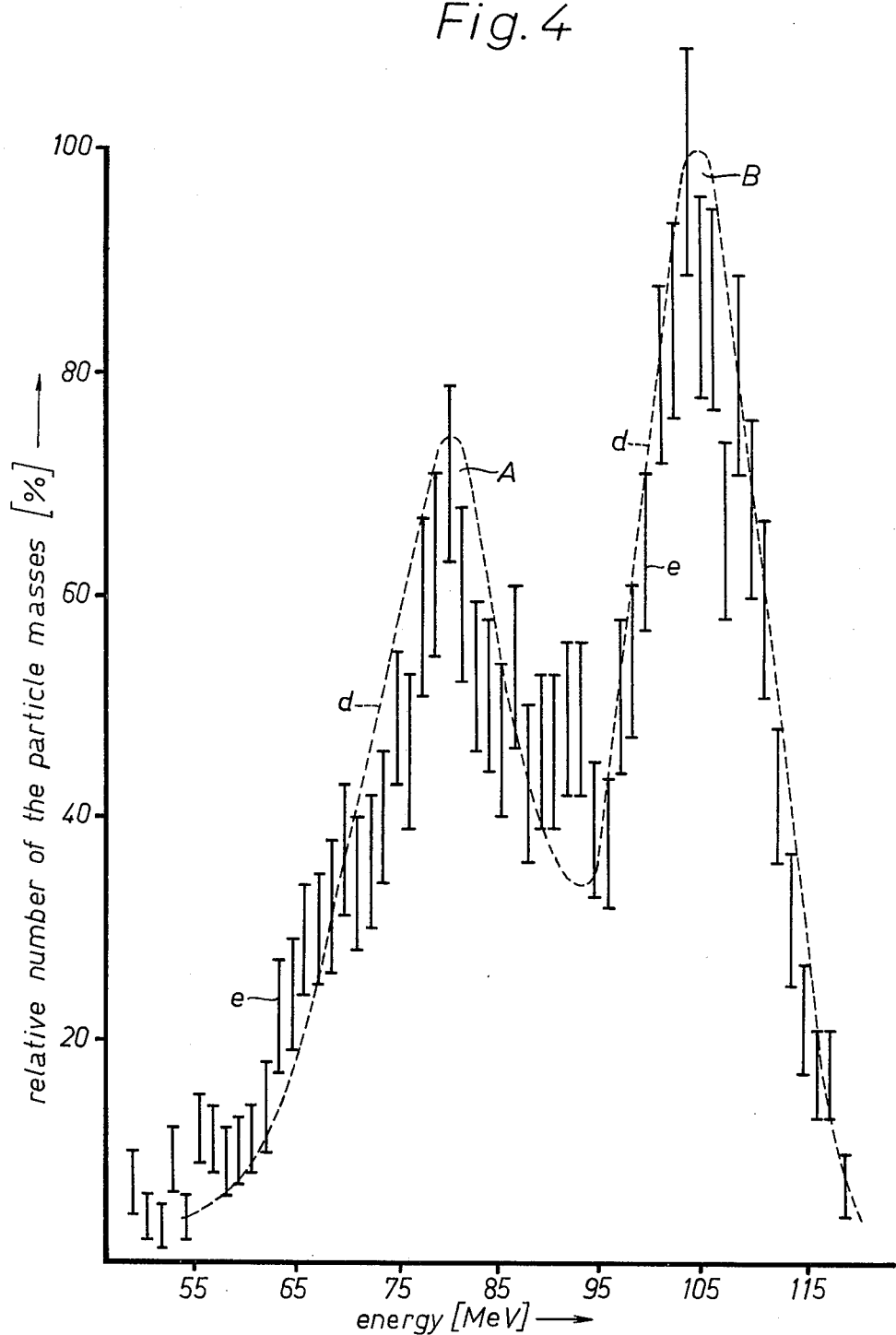
FIG. 4 shows the energy distribution curve of fission fragments for the spontaneous nuclear fission of $^{252}Cf$.

As an example of one possibility of use of the new material as energy-resolving detector material there are shown in FIGS. 4 and 5 the energy distribution curves of fission fragments for the spontaneous nuclear fission of $^{252}$Cf and for the electron induced nuclear fission of $^{232}$Th.

In FIG. 4 there is drawn a dashed line curve d which is based on measurements made by Schmitt et al. (see "Physical Review" vol. 137 B (1965), page 837) with silicon solid-state barrier-layer counters. Rather good agreement can be noted with the measured-value curve consisting of individual "measurement bars" e which was obtained after evaluation of the etched detector material according to the present invention. About the same half-widths values result with respect to the two comparable peaks A and B in each case.

The curve in FIG. 5 also shows a very good energy resolution with half-widths values of the two peaks of 15MeV and 16 MeV.

It was also found that it is possible, for instance, with the detector material of the present invention to determine differences in the depth of the valley between the two peaks for different electron energies and to conclude therefrom whether the mass distribution on nuclear fission are symmetrical or asymmetrical.

I claim:

1. An inorganic vitreous detector material having the properties of excellent energy resolution for impinging heavy ions and fission products, a high dependence of specific hole diameter with respect to impinging particle energy and as being substantially insensitive to background electrons and gamma-rays, said material consisting essentially of:
   a. silicon dioxide $SiO_2$ and boron trioxide $B_2O_3$ in an amount not exceeding about 10% by weight; and
   b. the balance, a three-component basic system consisting essentially of metaphosphoric acid, aluminum metaphosphate and zinc oxide within the following concentration limits:
      about 20 to 60% by weight of metaphosphoric acid $HPO_3$,
      about 30 to 80% by weight of aluminum metaphosphate $Al(PO_3)_3$, and
      about 2 to 30% by weight of zinc oxide ZnO.

2. The inorganic vitreous detector material as defined by claim 1, wherein the concentration limits of said metaphosphoric acid, aluminum metaphosphate and zinc oxide are determined by the boundaries of the hatched area of the ternary diagram in FIG. 1.

3. The inorganic vitreous detector material as defined by claim 1, wherein said silicon dioxide $SiO_2$ is present in an amount of about 1% by weight and said boron trioxide is present in an amount of about 4.5% by weight.

4. The inorganic vitreous detector material as defined by claim 1, consisting essentially of:
   9.0%, by weight, of zinc oxide ZnO,
   34.2%, by weight, of aluminum metaphosphate $Al(PO_3)_3$,
   51.3%, by weight, of metaphosphoric acid $HPO_3$,
   4.5%, by weight, of boron trioxide $B_2O_3$, and
   1.0%, by weight, of silicon dioxide $SiO_2$.

* * * * *